United States Patent [19]

Ito

[11] Patent Number: 5,622,365
[45] Date of Patent: Apr. 22, 1997

[54] SHEET FEEDING METHOD AND APPARATUS

[75] Inventor: Yoshio Ito, Tokyo, Japan

[73] Assignee: Canon Kabushiki Kaisha, Tokyo, Japan

[21] Appl. No.: 358,962

[22] Filed: Dec. 19, 1994

Related U.S. Application Data

[63] Continuation of Ser. No. 31,310, Mar. 15, 1993, abandoned.

[30] Foreign Application Priority Data

| Mar. 16, 1992 | [JP] | Japan | 4-89263 |
| Mar. 24, 1992 | [JP] | Japan | 4-96003 |

[51] Int. Cl.$^6$ ............................................. B65H 5/00
[52] U.S. Cl. ......................... 271/264; 271/3.01; 271/902
[58] Field of Search .................... 271/3.01, 4.01, 271/225, 264, 272, 145, 163, 216, 902; 353/103, 108, 109, 113, 116, 117, 118, DIG. 1, DIG. 5, DIG. 3; 242/179

[56] References Cited

U.S. PATENT DOCUMENTS

| 4,707,092 | 11/1987 | Mindell | 353/109 |
| 4,942,411 | 7/1990 | Polston | 353/26 R |
| 4,944,586 | 7/1990 | Rightmyre | 353/108 |
| 5,172,145 | 12/1992 | Stephenson | 353/103 |
| 5,228,670 | 7/1993 | Kobler | 271/216 X |

FOREIGN PATENT DOCUMENTS

| 59-202442 | 11/1984 | Japan . | |
| 62-258437 | 11/1987 | Japan . | |
| 2-13521 | 1/1990 | Japan | 271/145 |
| 2-259633 | 10/1990 | Japan . | |
| 4-307531 | 10/1992 | Japan . | |

*Primary Examiner*—David H. Bollinger
*Attorney, Agent, or Firm*—Fitzpatrick, Cella, Harper & Scinto

[57] ABSTRACT

A sheet original feeding apparatus includes a pair of spaced core members, a frame for rotatably holding the core members, and an elongated sheet having each end connected to the core members, wound around one of the core members, and adapted to hold a sheet original therein. A driver reversibly drives the core members, and a controller controls the driver to unwind the elongated sheet, thereby stopping the sheet original at a predetermined position.

23 Claims, 10 Drawing Sheets

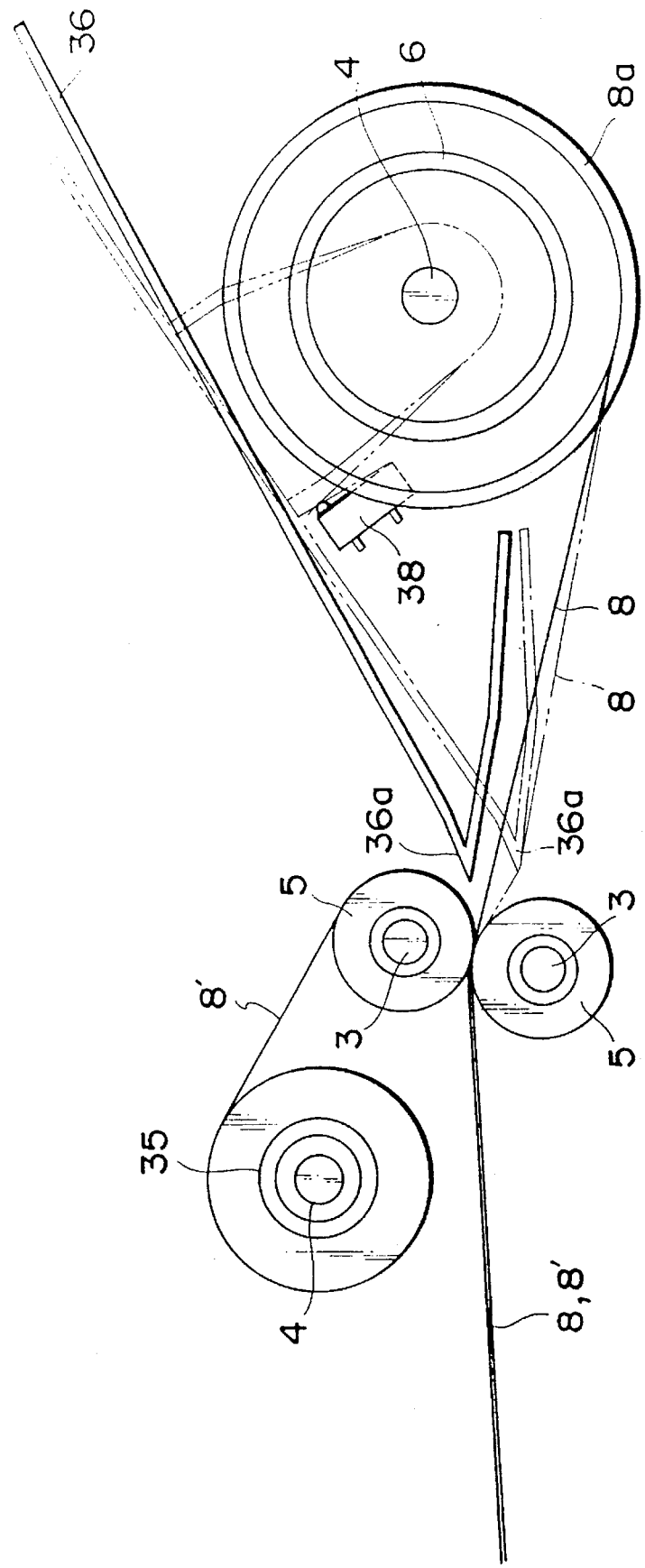

SHEET FEEDING METHOD AND APPARATUS

This application is a continuation of application Ser. No. 08/031,310, filed Mar. 15, 1993 now abandoned.

BACKGROUND OF THE INVENTION

1. Field of the Invention

The present invention relates to a sheet original feeding apparatus mountable on an overhead projector (OHP) on which a sheet original comprising an elongated transparent sheet having thereon information such as an image, a graph or the like are rested and which is adapted to project such information on a screen, and more particularly, it relates to a sheet original feeding apparatus wherein a plurality of sheet originals are stocked and the sheet originals are effectively fed to a projecting station successively.

2. Related Background Art

Conventionally, in a conference or lecture, when the lecturer performs the presentation of the information recorded on OHP films (sheet originals) by using a projector, a plurality of sheet originals on which the information is recorded have previously been prepared in explanation order, and the lecturer himself or a assistant manually rests the originals one by one on a transparent and permeable glass platen of the overhead projector, thereby projecting the information in the original on the screen, and the used original is manually removed and a new original is rested on the platen.

On the other hand, regarding a 35 mm film having images thereon contained in the mount, since the images in the film can be protected by the mount, the exchange of the images in the film has been automatically effected by using an auto carrier device so that the film can mechanically be fed successively. In this case, however, since the small image in each frame of the film must be projected in an enlarged scale, the image quality was worsened, and the dark room was required because of the reduction in the light amount.

By the way, an OHP apparatus can eliminate the above-mentioned drawbacks, can project images on a large-sized film and can present the image information with good image quality in a relatively light room. In an OHP film used with such OHP apparatus, original images can easily be formed on the film by performing the high speed treatment regarding a conventional silver salt film, or by forming digital color images by an electrophotographic method, or by a high image quality ink jet method.

However, in the above-mentioned conventional techniques, the exchanging efficiency of sheet originals in accordance with the progress of the lecturer's presentation has not been improved, since it was difficult to handle the OHP film because of the large size thereof. Accordingly, it has been desired that the original image film was automatically fed to the projecting station on the OHP apparatus.

Incidentally, in order to pick up the high image quality films one by one from the film stack successively and to rest the picked-up film on the glass platen of the OHP apparatus without damaging the surfaces of the films, a method (adopted to a copying machine) wherein sheets are separated one by one by utilizing the friction slip between the sheets in a sheet stacking station such as a sheet feeder cannot be used.

Further, since any original image film among the used and re-stacked original image films may be used again to project it again in the course of the presentation, it is desired to propose a solution having the safety and high reliability and which can easily pick up the film without damaging the film surface.

SUMMARY OF THE INVENTION

The present invention aims to eliminate the above-mentioned conventional drawbacks, and an object of the present invention is to provide a sheet original feeding method and apparatus, and an OHP apparatus utilizing it, which can hold sheet originals so as to easily feed the sheet original and which can improve the safety and the reliability.

In order to achieve the above object, according to the present invention, for example, an elongated transparent sheet both ends of which are connected to a pair of core spools, respectively, is completely rolled around one of the core spools, and sheet originals are successively rested on a surface of the elongated sheet side by side while winding the elongated sheet around the other core spool successively to hold the sheet originals between the convolutions of the elongated sheet, and a desired sheet original is picked up by unwinding the elongated sheet from the other spool by a predetermined length.

Further, according to the present invention, there is provided a sheet feeding apparatus comprising a frame for rotatably holding a pair of core spools, an elongated transparent sheet both ends of which are connected to the core spools, respectively, and which is completely wound around one of the core spools, convey means for conveying sheet originals rested on a surface of the elongated sheet, and drive means for reversibly driving the core spools and the convey means.

With the arrangement as mentioned above, the elongated sheet, both ends of which are connected to the core spools, is previously wound around one of the core spools, and then, the core spools and the convey means are driven normally by the drive means, so that the sheet originals can successively be rested on the surface of the elongated sheet fed from one core spool while winding the elongated sheet around the other core spool, thereby holding the sheet originals between the convolutions of the elongated sheet on the other core spool. In this way, the sheet original can be protected from contacting with the other sheet originals and with the apparatus.

Further, since the sheet originals are rested on the elongated sheet which is then wound around the other core spool, a plurality of sheet originals can be held on the elongated sheet in an order opposite to the presentation order.

Furthermore, when the held sheet originals are to be picked up, by shifting the elongated sheet through the projecting station by reversely driving the convey means and the core spools by the drive means, the sheet originals can be brought onto the projecting station in the presentation order. Incidentally, when any sheet original which was once projected is to be projected again, such sheet original can be brought onto the projecting station by normally driving the convey means and the core spools by the drive means.

In addition, if the rolling up position of the sheet original is varied as a diameter of the roll of the wound elongated sheet is changed, by lowering a leading end of the sheet original along the elongated sheet by the weight of the sheet while wrapping the elongated sheet around the convey means, elongated sheet can be stably wound around the core spool without creating rumples or undulation in the elongated sheet.

Further, by providing slipping means at a drive transmitting portion to the core spools, if the diameter of the roll of the wound elongated sheet is changed as the elongated sheet is unwound from the roll on the core spool, the elongated sheet can be fed out at a speed same the same as that of the convey means.

Furthermore, by switching the driving direction of the driven means with remote control, the switching of the sheet originals can be effected more swiftly, thus improving the usability.

Further, when sheet detection means is provided, by detecting leading and trailing ends of the sheet original, it is possible to set a desired sheet original on the proper projecting station, regardless of the size of the sheet original.

BRIEF DESCRIPTION OF THE DRAWINGS

FIG. 10 is a sectional view for explaining a recovery operation for a sheet original.

DETAILED DESCRIPTION OF THE PREFERRED EMBODIMENTS

Figure 1:
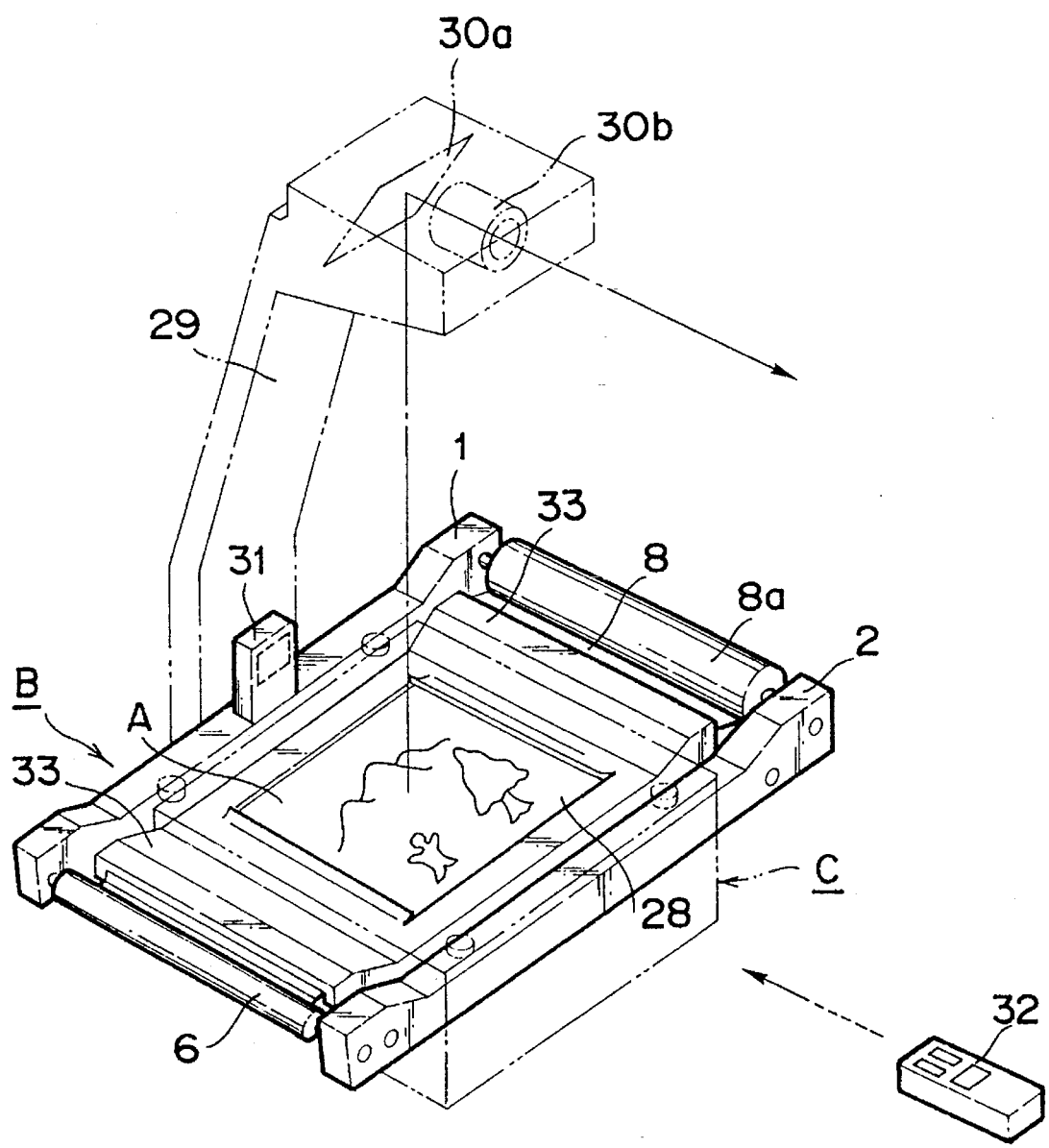
FIG. 1 is a perspective view of an OHP apparatus.
Figure 2:
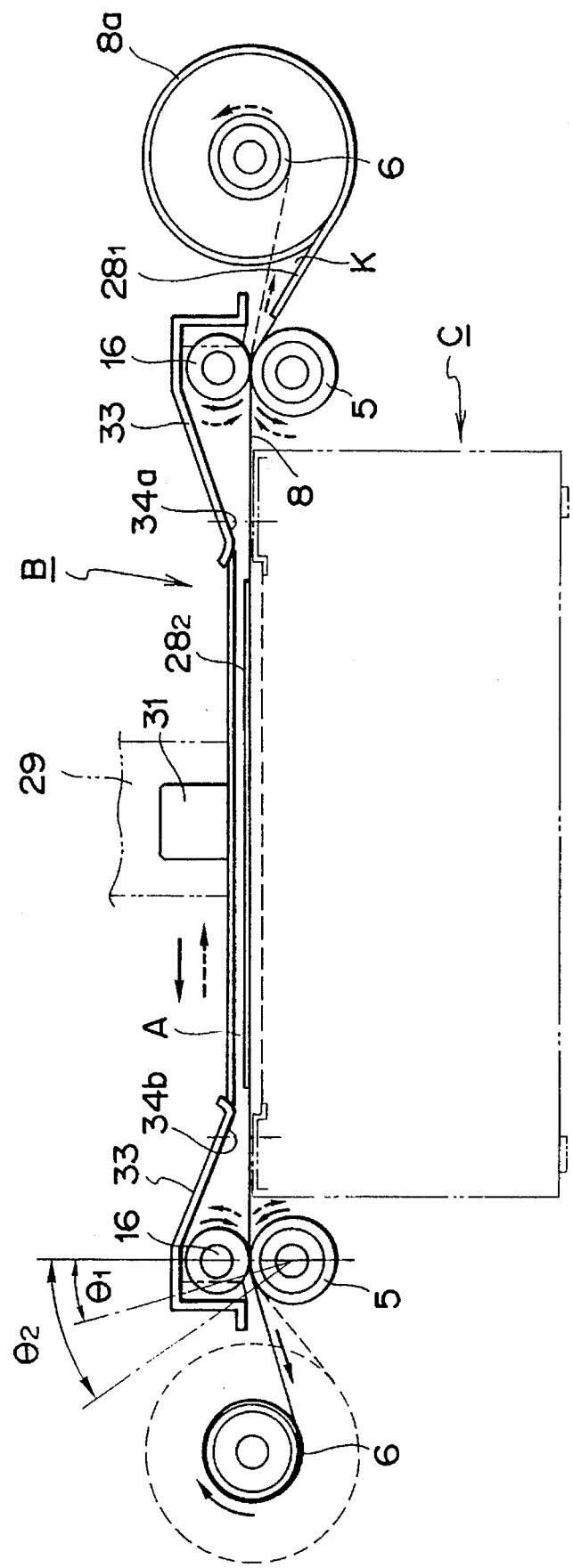
FIG. 2 is a front view of the OHP apparatus.
Figure 4:
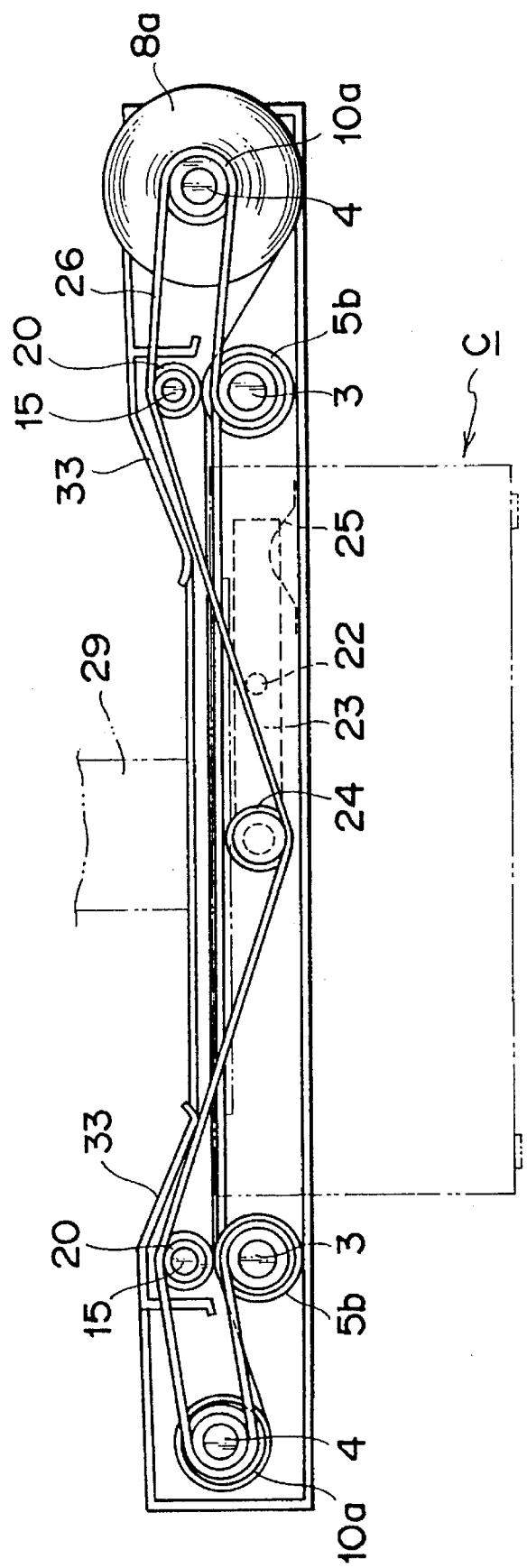
FIG. 4 is a front view of the sheet feeding apparatus.
Figure 5:
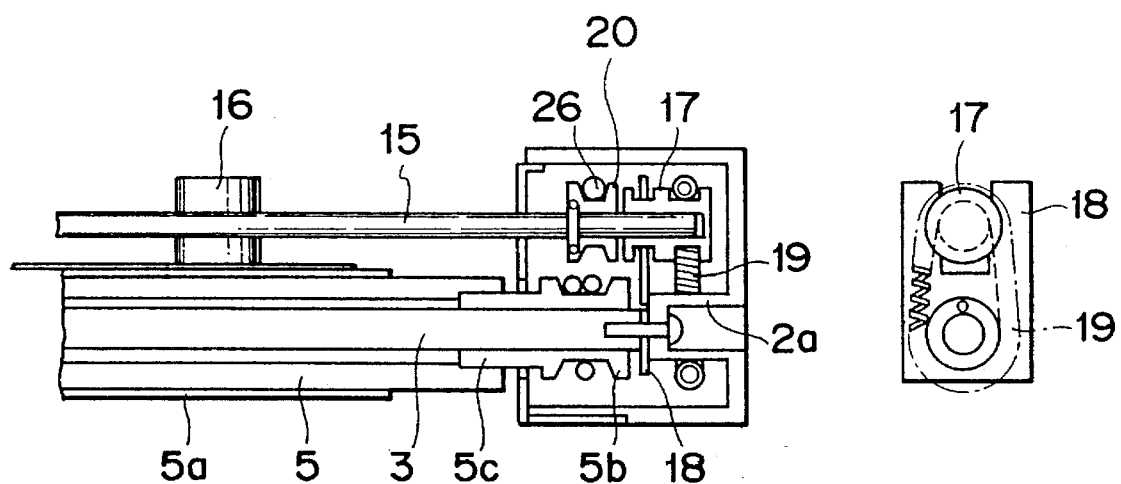
FIG. 5 is a sectional view for explaining a drive transmitting portion for a convey roller.

First of all, a sheet feeding apparatus according to a first embodiment of the present invention will be explained with reference to the accompanying drawings. FIG. 1 is a perspective view of an OHP system, FIG. 2 is a front view of the OHP apparatus, FIG. 3 is a plan view of a sheet feeding apparatus according to the first embodiment, FIG. 4 is a front view of the sheet feeding apparatus, and FIG. 5 is a sectional view of a drive transmitting portion for a convey roller of the sheet feeding apparatus.

Now, the construction of the sheet original feeding apparatus will be described with reference to FIGS. 3 to 5.

Figure 3:
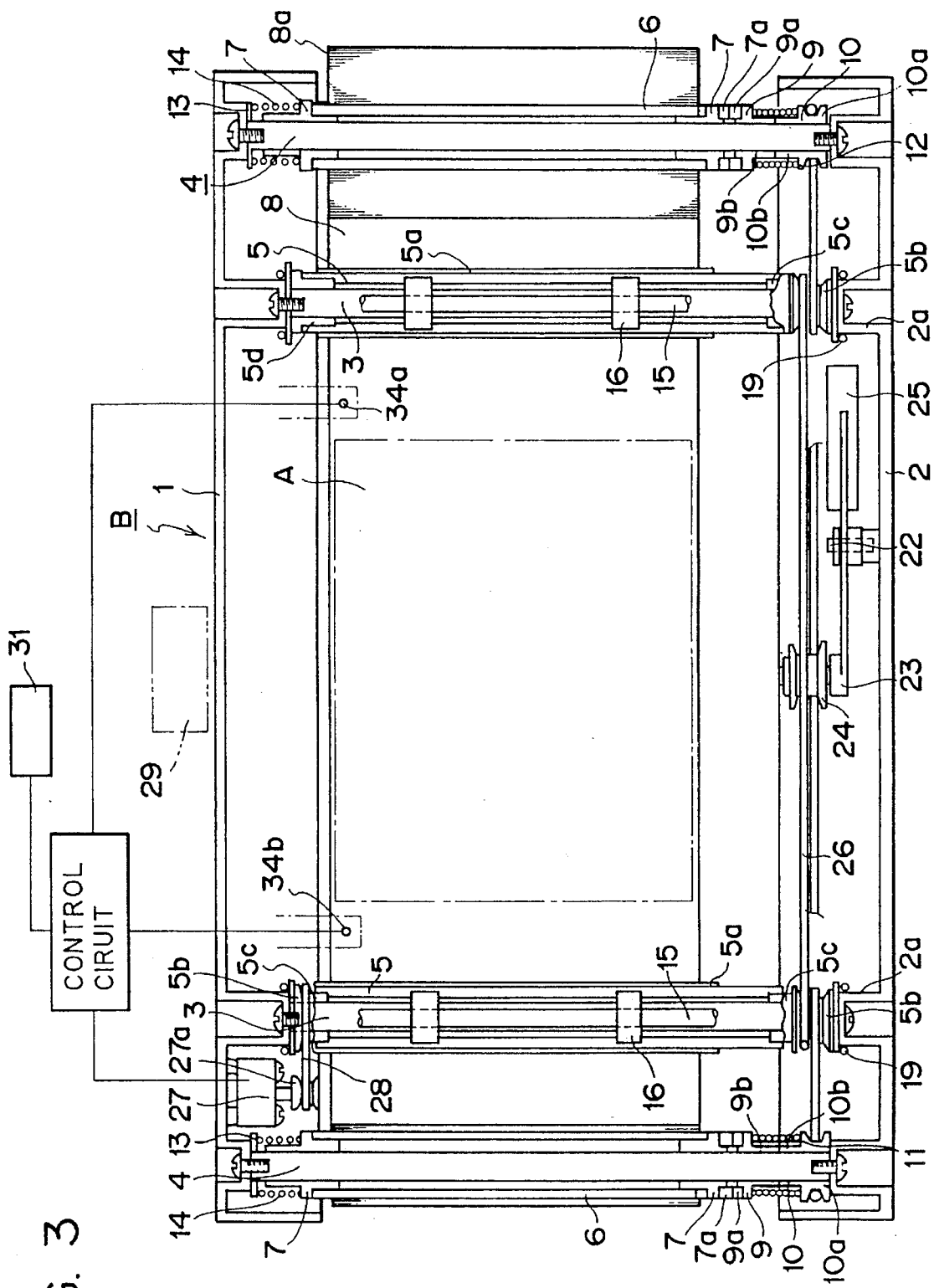
FIG. 3 is a plan view of a sheet feeding apparatus according to a preferred embodiment of the present invention.

In FIG. 3, frames 1, 2 are interconnected via left and right support shafts 3, 4 by screws. An area A enclosed by the support shafts 3, 4 and the frames 1, 2 forms a projecting station on which an OHP film (sheet original) is rested and in which an image on the OHP film is projected onto a screen via permeable light.

Convey rollers (convey means) 5 for feeding an elongated film sheet on which the OHP films are rested are rotatably mounted on the support shafts 3 respectively. Each convey roller 5 has a thick rubber layer 5a thereon and is designed as a cylindrical form having a length covering a width of the OHP film. Flanges 5c each having a pulley 5b are fitted into both ends of the left convey roller 5; whereas, a flange 5c having a pulley 5b and a flange 5d are fitted into lower and upper ends of the right convey roller 5, respectively. The convey rollers are rotatable around the corresponding support shafts 3 via these flanges 5c, 5d as bearings.

The support shafts 4 constitute cores around which core cylinders 6 are rotatably mounted via end bearings 7. Both ends of the elongated film sheet 8 are adhered and connected to the left and right core cylinders 6, respectively. In a condition shown in FIG. 3, the film sheet 8 is completely wound around the right core cylinder 6. Hollow friction rings 7a each made of anti-wear material are integrally attached to lower ends (near the frame 2) of the bearings 7. Friction rings 9a having the same shape as those of the friction rings 7 are face-to-face contacted with the corresponding friction rings 7 and are integrally fitted onto clutch barrels 9 rotatably mounted in the support shafts 4.

Further, another clutch barrel 10 is rotatably fitted onto the end of the corresponding support shaft 4 with face-to-face contact with the corresponding clutch barrel 9, and a pulley 10a is integrally formed with the clutch barrel 10. Clutch springs 11, 12 for transmitting a driving force are arranged around barrel portions 9b, 10b of the left and right clutch barrels 9, 10, respectively. The left and right clutch springs 11, 12 have windings opposite to each other, so that, when the pulley 10a is rotated in a clockwise direction, the right clutch spring 12 is tightened against the barrel portions 9b, 10b to lock the clutch barrels 9, 10, thereby transmitting a driving force to the right core cylinder 6 through the friction force due to the coefficient of friction between the hollow friction ring 7a and the friction ring 9a. On the other hand, in this case, the left clutch spring 11 is loosened to increase a diameter thereof, with the result that the clutch spring 11 is slipped on the barrel portion 9b of the left clutch barrel 9, thereby inhibiting the transmission of the driving force to the clutch barrel 9.

Incidentally, when the pulley 10a is rotated in an anti-clockwise direction, the clutch spring 11 is tightened and the clutch spring 12 is loosened.

Further, a coil spring 14 is arranged in a compressed condition between the bearing 7 at the upper end (near the frame 1) of each support shaft 4 and an abutment portion 13 formed on the upper end of the support shaft 4 so that the corresponding core cylinder is biased in a thrust direction by a force F, thereby closely contacting the hollow friction ring 7a (at the opposite end) with the friction ring 9a, with the result that a friction force μF is generated in a contact area between the friction rings 7a and 9a, thus transmitting a rotational force of the pulley 10a to the core cylinder 6. If a force greater than the friction force μF is applied to the core cylinder 6, the slip will occur between the hollow friction ring 7a and the friction ring 9a.

Further, as shown in FIG. 5, a roller shaft 15 is disposed above each convey roller 5 to pair with the support shaft 3, and auxiliary convey rollers 16 comprising rubber rollers pairing with the convey roller 5 are attached to the roller shaft 15. The auxiliary rollers 16 cooperate with the convey roller 5 to feed the film sheet 8. A bearing 17 is mounted on an end of the roller shaft 15 and is slidably held in a slot formed in a small side plate 18 for sliding movement in an up-and-down direction, which small side plate is held in a connecting portion between the support shaft 3 and the frame 2. A ring-shaped coil spring 19 extends between the bearing 17 and a projection 2a of the frame 2 and is wound around them, thereby providing an urging force between the auxiliary convey rollers 16 and the convey roller 5.

Further, a pulley 20 is mounted on the roller shaft 15 near the bearing 17 and is integrally connected to the roller shaft 15 by a drop-in pin 21. A rotational force of the pulley 20 is transmitted to the auxiliary convey rollers 16 via the roller shaft 15. A diameter of the pulley 20 is so selected that a peripheral speed of each auxiliary convey rollers 16 is the same as that of the convey roller 5 so that the rotational force can be transmitted from the auxiliary convey rollers 16 to the convey roller 5.

Further, as shown in FIG. 3, a fixed shaft portion 22 is provided on the frame 2, and the rocker arm 23 is pivotally mounted on the fixed shaft portion 22. A tension pulley 24 is rotatably mounted on one end of the rocker arm 23, and the other end of the rocker arm is biased by a pressure plate 25 provided on the frame 2 so that the rocker arm 23 is biased toward an anti-clockwise direction.

An endless drive belt 26 is disposed at a side of the frame 2. This belt 26 extends between the left and right pulleys 5b of the convey rollers 5 and is wound around these pulleys by one revolution, respectively, and then passes around the left and right pulleys 10a of the core cylinders 6 and then passes on the left and right pulleys 20 connected to the auxiliary convey rollers 16 and reaches on the tension pulley 24. The tension pulley 24 is supported by the rocker arm 23 biased toward the anti-clockwise direction, thereby applying a constant tension force to the drive belt 26.

A pulse motor (drive means) 27 is secured to the frame 1 and serves to transmit the driving force to the convey rollers 5 and the core cylinders 6 to rotatingly drive them reversibly, as will be described later. An endless drive belt 28 extends between the wound around motor pulley 27a secured to a motor shaft of the pulse motor 27 and the pulley of the upper flange 5c of the left convey roller, so that the driving force from the pulse motor 27 is transmitted to the left convey roller 5 via the motor pulley 27a, pulley 5b and the drive belt 28 and then is transmitted to the other rollers via the lower pulley 5b of the left convey roller and the drive belt 26. Incidentally, a line speed of the periphery of the left core cylinder 6 becomes the same as that of the right core cylinder by appropriately selecting diameters of the associated pulleys.

Further, although when the pulse motor 27 is rotated normally or reversely, the normal or reverse driving force is transmitted to the convey rollers 5 and the core cylinders 6, as mentioned above, one of the core cylinders 6 is stopped by the action of the clutch springs 11, 12. Further, even when the rotational force is transmitted to the other core cylinder 6, if the load greater than the predetermined value is applied to the core cylinder 6, the slip will occur between the friction ring 9a and the hollow friction ring 7a, thereby releasing the excessive rotational torque.

Further, in the illustrated embodiment, the transparent film sheet 8 is preferably thin as long as possible, so long as sufficient strength of the film sheet is maintained. Preferably, the film sheet has a thickness of about 25–60 μm. The film sheet is preferably made of material having good light permeability and good heat resistivity, such as polyester terephthalate (Myler: registered trade mark) or the like.

Next, an OHP apparatus C incorporating the above-mentioned sheet original feeding apparatus B will be explained.

In FIG. 1, the sheet original feeding apparatus B is mounted on a conventional OHP apparatus C (shown by the two-dot chain line) in such a manner that a projecting station A is aligned with an illumination area illuminated by permeable light emitted from the OHP apparatus C. The permeable light passing through an OHP film 28 rested on a portion of the film sheet 8 positioned on the projecting station A is reflected by a reflection mirror 30a supported by an overhead arm 29 to pass through a lens 30b, and then is projected onto a screen (not shown). It should be noted that the OHP apparatus can be used as an OHP apparatus without the sheet original feeding apparatus in a conventional manner.

Further, as shown in FIG. 1, a receiving portion 31 is arranged on the frame 1 of the sheet original feeding apparatus B so that the operation of the pulse motor 27 can be remotely controlled by a remote controller (transmitter) 32. Further, as shown in FIG. 2, a cover member 33 is arranged above the convey rollers 5 and the auxiliary convey rollers 16, and sheet sensor (sheet detection means) 34a, 34b are disposed on an inner surface of the cover member 33 near the projecting station A. The sheet sensors 34a, 34b serve to detect leading and trailing ends of the OHP film 28 rested on the film sheet 8 and conveyed therewith to count the number of the OHP films 28.

Next, the use of the sheet original feeding apparatus B mounted on the OHP apparatus C will be explained.

As shown in FIG. 2, both ends of the elongated film sheet 8 is previously adhered to the core cylinders 6 respectively, and the film sheet is previously wound around one (left one) of the core cylinders 6 substantially completely. Incidentally, the film sheet is wound around the other (right one) core cylinder by two or three revolutions for leaving a margin. The core cylinders 6 are mounted on the frames 1, 2, and the film sheet 8 is tensioned and is passed between the convey rollers 5 and the auxiliary convey rollers 16. A height of a line connecting between the left and right nips between the convey rollers 5 and the auxiliary convey rollers 16 is adjusted with respect to the frames 1, 2 in such a manner that a back surface of the film sheet 8 is lightly contacted with a permeable surface on the top of the OHP system C.

Then, at the projecting station A of the sheet original feeding apparatus B wherein the film sheet 8 was so set, the OHP film 28 is rested on the film sheet. Then, when the pulse motor 27 is rotated in the anti-clockwise direction on the basis of the command from the remote controller 32, the convey rollers 5 and the auxiliary convey rollers 16 shift the film sheet 8 on which the OHP film 28 was rested in a direction shown by the broken line arrow in FIG. 2. The right (FIG. 2) core cylinder 6 is rotated in the anti-clockwise direction by the driving force transmitted via the clutch spring 12 to wind the film sheet 8 therearound. On the other hand, since the clutch spring 11 is loosened, the driving force is not transmitted to the left core cylinder 6. However, since the left core cylinder is pulled by the film sheet 8, the film sheet 8 is unwound from the left core cylinder.

After the film sheet is wound around the right core cylinder by the predetermined amount, the pulse motor is stopped. Then, the next OHP film is rested on the film sheet at the projecting station. Then, the pulse motor is rotated again in the same direction to further feed the film sheet to wind it around the right core cylinder. The above-mentioned operation is repeated regarding the successive OHP films in an order opposite to the presentation order.

In this way, the OHP films 28 are successively rolled in between the convolutions of the film sheet wound around the right core cylinder. As the diameter of the sheet roll 8a is increased by winding the film sheet 8 with the OHP 28 sheets around the right core cylinder 6, the winding speed of the film sheet 8 becomes greater than the film sheet feeding speed of the paired convey rollers 5, 16, thereby increasing the tension force between the film sheet 8 and the paired convey rollers 5, 16. However, due to the slip between the friction ring 9a and the hollow friction ring 7a, the excessive torque on the core cylinder is released, thereby maintaining the peripheral speed of the convey roller 5 to become the same as the peripheral speed of the sheet roll, with the result that the film sheet 8 can be fed stably.

Further, since the OHP film 28 is subjected to the driving force from both the convey roller 5 and the auxiliary convey rollers 16, it can be shifted without skew-feed and without slip between the image surface of the film and the roller surface.

When a distance between the nip between the paired convey rollers 5, 16 and a center of the sheet roll 8a is previously set to a predetermined value, the OHP film 28 passed through the nip of the paired convey rollers 5, 16 is lowered by its own weight so that a leading end of the OHP film is regulated by the upper surface of the film sheet 8, with the result that the OHP film 28 enters into a wedge-shaped space K defined between the sheet roll 8a and the film sheet 8 and then is rolled in the sheet roll 8a around the core cylinder 6 while being pinched between an outer surface of the sheet roll 8a (i.e., back surface of the film sheet 8) and the upper surface of the film sheet 8.

By repeating the above-mentioned operation, a plurality of OHP films 28 are wound together with the film sheet 8 around the core cylinder 6 in the order opposite to the presentation order to be temporarily stocked on the core cylinder. In this way, the preparation for the projection is completed. Incidentally, the rotation of the pulse motor 27 can be stopped at any position by the command from the remote controller 32.

Thereafter, when the pulse motor 27 is rotated in the anti-clockwise direction (FIG. 3) on the basis of the command from the remote controller 32, the convey rollers 5 and the auxiliary convey rollers 16 shift the film sheet 8 to the left as shown by the solid line arrow in FIG. 2. As a result, the OHP films 28 stocked in the sheet roll 8a on the right (FIG. 3) core cylinder 6 are fed out from the sheet roll 8a together with the film sheet 8. In this case, due to the elastic restoring force of the film itself tending to restore the OHP film to the original flat condition, the OHP films are always contacted with the film sheet 8, thereby feeding out the OHP films stably. In this case, the driving force from the pulse motor 27 is transmitted to the left (FIG. 2) core cylinder 6 via the clutch spring 11, with the result that the left core cylinder 6 is rotated in the clockwise direction to wind the film sheet 8 at some speed as the peripheral speeds of the paired convey rollers 5, 16. On the other hand, since the clutch spring 12 is loosened, the driving force is not transmitted to the right core cylinder 6. However, since the constant tension is applied to the film sheet 8, the film sheet is unwound from the right core cylinder at the same speed same as the peripheral speeds of the paired convey rollers 5, 16, in opposition to the friction force between the hollow friction ring 7a and the friction ring 9a.

As mentioned above, the OHP film 28 fed out together with the film sheet 8 on which the OHP film is rested is conveyed toward the nip between the paired convey rollers 5 and 16, and then is conveyed together with the film sheet 8 toward the projecting station A by the rotation of the paired convey rollers 5, 16. In this case, the leading and trailing ends of the OHP film 28 are detected by the sheet sensor 34a arranged on the inner surface of the cover member 33, with the result that the number of pulses is counted until the pass signal is detected, thereby determining the length of the OHP film 28. On the basis of this data, the OHP film is brought to the central position of the projecting station A in a conventional manner, and then the pulse motor 27 is stopped.

As shown in FIG. 1, the permeable light emitted from the OHP apparatus C projects the image in the OHP film 28 rested on the film sheet 8 positioned on the projecting station A onto the screen (not shown) through the reflection mirror 30a and the lens 30b.

Then, when the projected OHP film 28 is to be replaced by the next OHP film, the pulse motor 27 is rotated again in the same direction on the basis of the command from the remote controller 32. Consequently, the used or projected OHP film 28 is shifted to the left together with the film sheet 8 to pass through the nip between the left pair of convey rollers 5, 16. The OHP film 28 passed through the nip is lowered by its own weight along the upper surface of the film sheet 8 to enter into the wedge-shaped space defined between the sheet roll 8a and the film sheet 8, with the result that the OHP film sheet is rolled up in the sheet roll 8a around the left core cylinder 6 while being pinched between the outer surface of the sheet roll and the upper surface of the film sheet 8 (i.e., between the two adjacent convolutions of the film sheet). During this feeding operation, when the next OHP film 28 is brought to the projecting station A, the pulse motor 27 is stopped.

Although the thinner the film sheet 8 the greater the number of OHP films 28 held in the sheet roll 8a, if the film sheet is too thin, it is feared that the rumples or undulation are generated in the film sheet while it is being fed by the paired convey rollers 5, 16. Further, in many cases, since the image is formed on the upper surface of each OHP film 28, it is preferable that the number of parts which are contacted with the imaged surface of the OHP film during the feeding of the film is reduced. Thus, when the thin film sheet 8 is fed by a pair of rollers, since the rollers must be contacted with the sheet surfaces with high accuracy (keeping the flatness), the rollers are obliged to be contacted with the entire area of the imaged surface of the OHP film.

In the illustrated embodiment, the rotational axis of the core cylinder 6 which winds up the film sheet 8 is arranged so that the outer peripheral surface of the core cylinder 6 is offset (downwardly in FIG. 2) from a plane including a tangential line between the paired convey rollers 5 and 16, and further, it is designed so that the rolling up position of the maximum diameter sheet roll is displaced or changed in the same direction (downwardly) (refer to FIG. 2).

More specifically, as shown in FIG. 2, when the diameter of the sheet roll comprising the convolutions of the film sheet 8 wound around the core cylinder 6 a minimum, a tangential line regarding the winding direction of the film sheet 8 on the core cylinder extends to the nip between the paired convey rollers 5, 16, as shown in the left part of FIG. 2. That is to say, the film sheet 8 is contacted with the convey roller 5 at a position offset from the nip between the paired convey rollers 5, 16 by a center angle of $\theta_1$, and the film sheet 8 is wound around the core cylinder 6 at a position lower than the plane including the tangential line between the paired convey rollers 5, 16. Accordingly, the entire back or lower surface of the film sheet 8 is uniformly contacted with the convey roller 5 through an arcuated area corresponding to the winding angle $\theta_1$, thereby applying the uniform tension to the whole width of the film sheet 8, with the result that the film sheet 8 can be fed without any rumples or undulation, and the OHP films shifted together with the film sheet 8 can be wound around the core cylinder 6 while keeping the flatness thereof and while being pinched between the convolutions of the film sheet 8.

Further, when the diameter of the sheet roll 8a formed by the wound film sheet 8 and the projected OHP films 28 rolled up between the convolutions of the film sheet becomes maximum as shown by a broken line circle, as shown in FIG. 2, the winding angle of the film sheet 8 with respect to the convey roller 5 is increased to an angle of $\theta_2$, thereby further stabilizing the feeding operation.

Figure 6:
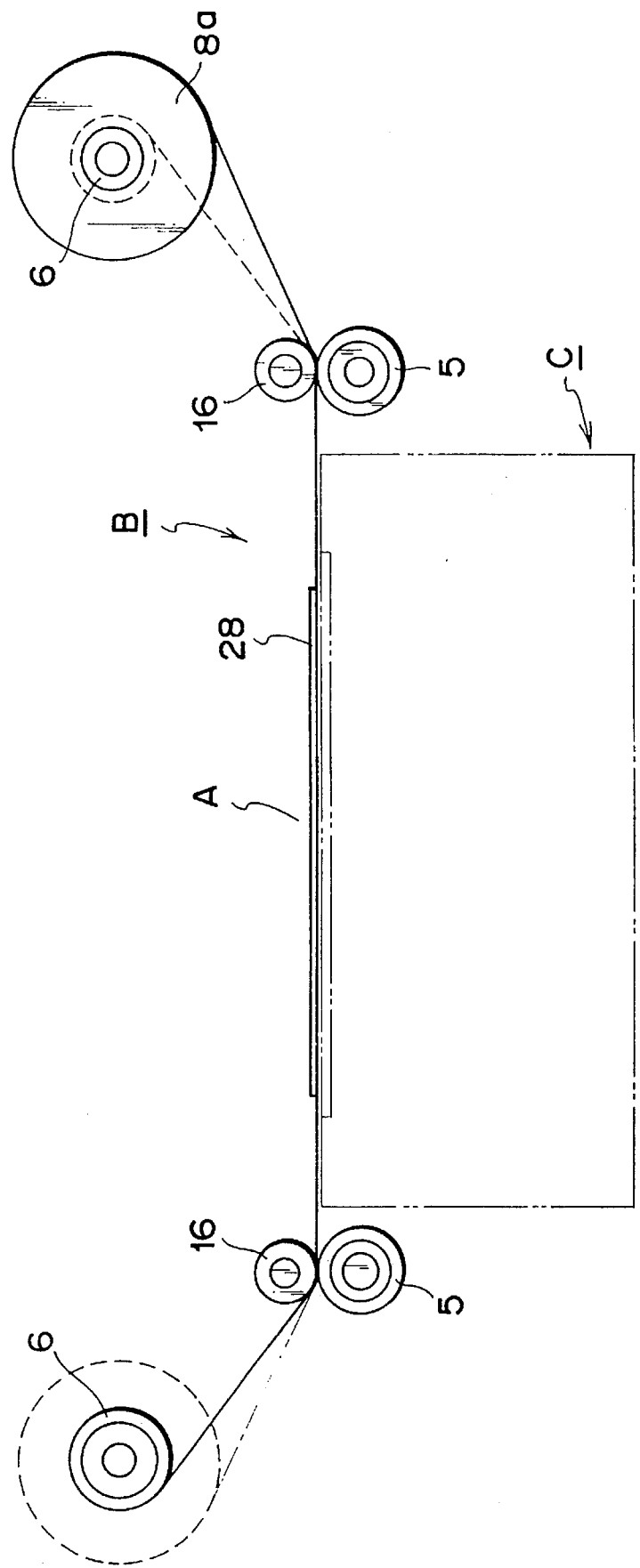
FIG. 6 is a schematic front sectional view of a sheet feeding apparatus according to another embodiment of the present invention.

Alternatively, as shown in FIG. 6, by arranging the core cylinder 6 so that the outer periphery of the maximum diameter sheet roll 8a on each core cylinder is positioned above the plane including the tangential line between the paired convey rollers 5, 16, the rolling-up of the film sheet 8 onto the core cylinder 6, the feeding of the OHP films 28 and the pinching of the OHP films between the convolutions of the film sheet 8, and the winding and unwinding of the film sheet and the OHP films can be more stabilized.

With the arrangement as mentioned above, since the OHP films 28 are conveyed together with the film sheet 8 in the order opposite to the explanation order to be wound around the core cylinder as the sheet roll and be stored in the sheet roll and the desired OHP sheet can be brought to the projecting station A by the remote control by the remote controller 32 at need, it is possible to project the images effectively, and it is also possible to project the image on the already projected OHP film again for a short time by the remote controller 32 at need.

Further, even when the rolling up position for the OHP film 28 is changed as the diameter of the sheet roll of the film sheet 8 is varied, since the leading end of the OHP film 28 is automatically lowered along the film sheet 8 to the nip between the film sheet and the sheet roll, it is possible to omit the conventional guides for directing the OHP film to the nip, and to improve the reliability of the feeding of the film sheet 8.

Further, since the rubber rollers are used as the auxiliary convey rollers 16 and these rollers are disposed intermittently, it is possible to suppress the contact between the rollers and the imaged surface of the OHP film 28 to the minimum extent. Further, since the driving force is transmitted to both of the paired convey rollers 5, 16, it is possible to prevent the skew-feed of the OHP film 28 and the relative slip between the rollers and the imaged surface of the OHP film. Accordingly, since the imaged surface of the OHP film 28 is not damaged and not scraped, it is possible to maintain the safety of the image to be projected.

Further, since the slipping movement is permitted between the hollow friction ring 7a and the friction ring 9a provided in the connecting portion between the bearing 7 and the clutch barrel 9, even when the diameter of the sheet roll 8a is changed as the film sheet 8 is wound or unwound to change the feeding speed of the film sheet 8, since the excessive rotational torque on the core cylinder 6 is released, it is possible to maintain the peripheral speed of the convey roller 5 to become the same as that of the sheet roll 8a. Further, since the film sheet 8 is conveyed while being contacted around the convey rollers 5, it is possible to wind the film sheet around the core cylinder 6 stably without any rumples and undulations.

Next, a further embodiment of a sheet original feeding apparatus B according to the present invention will be explained with reference to FIG. 7. Incidentally, the same constructional elements as those in the first embodiment are designated by the same reference numerals, and the detailed explanation thereof will be omitted.

In handling and storing the OHP films 28, since corners of each OHP film 28 are apt to be folded or damaged, it is feared that the flatness of the OHP film is worsened due to the curl of the OHP film. Conventionally, in the OHP apparatuses, it was feared that the curled OHP film was floated from the surface of the glass platen as the projecting station and sometimes the quality of the image projected and focused on the screen was worsened. In this embodiment, this problem can be solved. The construction of the sheet feeding apparatus according to this embodiment will be explained hereinbelow.

Figure 7:
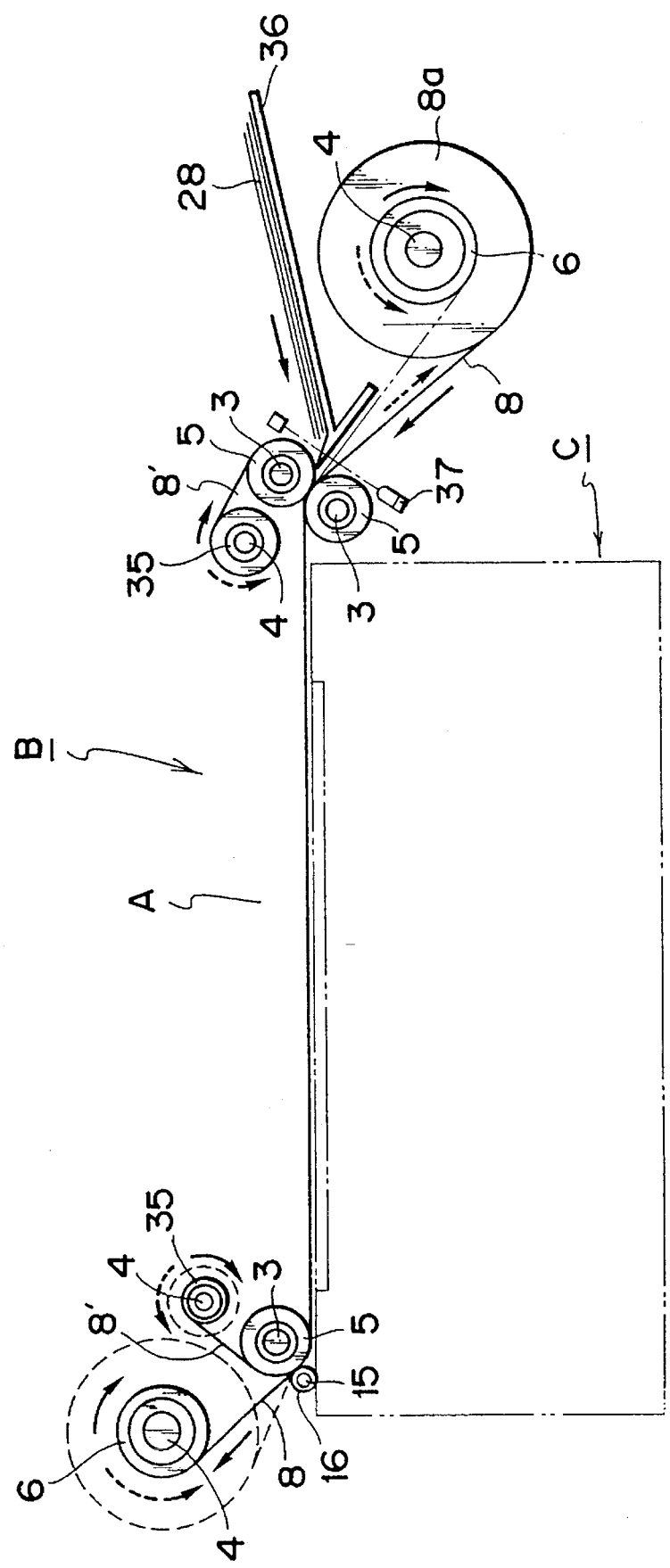
FIG. 7 is a schematic front sectional view of a sheet feeding apparatus according to a further embodiment of the present invention.

In FIG. 7, a plurality of parallel support shafts 4 are provided on both sides of a frame (not shown), and core cylinders 6, 35 are rotatably mounted around the support shaft 4, respectively. A film sheet 8 is connected to the left and right core cylinders 6, and a film sheet 8' is connected to the left and right core cylinders 35. These film sheets are wound around the feed-out core cylinders (right core cylinders) 6, 35.

In the vicinity of the feed-out core cylinders 6, 35, there are disposed a pair of convey rollers 5, and, in the vicinity of the take-up (left) core cylinders 6, 35, there are disposed a pair of convey rollers 5, 16. The film sheets 8, 8' fed out from the feed-out core cylinders 6, 35 are shifted by the left paired convey rollers 5, 16 and the right pair of convey rollers 5 in such a manner that the film sheets 8, 8' are overlapped at least at the projecting station A, and are rolled up around the take-up core cylinders 6, 35, respectively. The left and right convey rollers 5 can be rotated reversibly by a drive means (not shown).

Further, in the vicinity of a nip between the paired convey rollers 5 at the feed-out side, there is disposed a sheet stacking tray (sheet original guiding means) 36 for stacking OHP films 28 and for guiding the OHP film to the nip between the paired convey rollers 5. The sheet stacking tray 36 serves to guide the feeding direction of the OHP film 28 and the feeding of the film sheet 8, 8' into the feed-out side. Further, in the vicinity of the nip between the paired convey rollers 5, there is arranged a sheet sensor 37. When the sheet sensor 37 detects a leading end of the OHP film 28 inserted along the sheet stacking tray 36, the drive means (not shown) is driven normally to rotate the core cylinders 6, 35, thereby feeding the film sheets 8, 8' so that they are rolled up around the take-up core cylinders 6, 35, respectively. Meanwhile, the OHP film 28 is brought to the projecting station A while being pinched between the upper and lower film sheets 8, 8'.

The film sheets 8, 8' are shifted at the same feeding speed, and the curl in the OHP film 28 is corrected between the film sheets 8, 8' to maintain the flatness of the OHP film. The OHP film is brought to the projecting station A in this condition, and the image on the OHP film is projected onto the screen. Further, the OHP film 28 pinched between the film sheets 8, 8' is sent to the take-up side by the paired convey rollers 5, 16, and the OHP film is rolled up in the sheet roll on the left core cylinder 6 while being rested on the film sheet 8, and is held there.

Furthermore, friction mechanisms and slipping mechanisms comprising spring clutches the same as those in the first embodiment are arranged at drive transmitting portions regarding the core cylinders 6, 35, the pair of convey rollers 5 and the paired convey rollers 5, 16.

Next the use of the sheet original feeding apparatus B so constructed will be explained.

A plurality of OHP films 28 are previously stacked on the sheet stacking tray 36 in the explanation order or presentation order. Whenever the OHP films 28 (from the uppermost one on the stack) are successively inserted into the nip between the pair of convey rollers 5, the sheet sensor 37 detects each OHP film to activate the drive means so that each OHP film 28 is passed through the paired convey rollers 5, 16 while being pinched between the film sheets 8, 8' and then is rolled up in the sheet roll together with the film sheet 8 and temporarily held therein. In this way, all of the OHP films are stocked in the left sheet roll.

Then, the drive means is driven reversely so that the OHP films 28 are pinched again between the film sheets 8, 8' in the order opposite to the explanation order and are passed through the pair of convey rollers 5. Then, the OHP films are rolled up successively in the right sheet roll while being rested on the film sheet 8 and are held therein. In this way, prior to the presentation in the lecture, the OHP films 28 are stocked and held at the feed-out side in the explanation order, thus completing the preparation.

In performing the presentation in the lecture, as in the first embodiment, by feeding out the film sheet 8 wound around the feed-out core cylinder gradually, the OHP films 28 rolled up and held in the sheet roll can be brought to the projecting station A successively, and the projected OHP films can be rolled up around the take-up core cylinder 6 and be held between the convolutions of the film sheet 8.

On the other hand, when any OHP film 28 already projected is to be projected again, by driving the drive means reversely again so that the film sheets 8, 8' are fed to be wound around the feed-out core cylinders 6, 35, respectively, the desired OHP film can be brought to the projecting station A. In this case, the OHP film 28 shifted toward the feed-out side is passed through the pair of convey rollers 5 and then is guided or directed between a front guide of the sheet stacking tray 36 and the film sheet 8 without directing toward the feeding out direction of the film 28 (toward the sheet stacking position), and is surely inserted between the sheet roll on the feed-out core cylinder 6 and the film sheet 8 and then is rolled up in the sheet roll. Accordingly, since the film sheets 8, 8' can be advanced or returned from any position at any time, it is possible to omit the mechanism for detecting the shifting amount of the OHP film 28 as used in the first embodiment.

With the arrangement as mentioned above, the curl apt to be formed in the OHP film 28 can be corrected by pinching the film between the film sheets 8, 8', so that the OHP film can be brought to the projecting station A while maintaining the flatness thereof. Further, since the curl in the OHP film is prevented, it is also possible to prevent the skew-feed of the OHP film during the feeding of the film by means of the convey means. In addition, it is possible to maintain the quality of the image to be projected onto the screen as a projection surface.

Incidentally, the correction of the curl of the OHP film is not limited to the lamination of the film sheets as shown in this embodiment, but other correction methods may be used. For example, even when single film sheet 8 is used as in the first embodiment shown in FIG. 2, by determining the relative positional relation between the tangential line regarding the paired convey rollers 5, 16 at the feed-out side (right in FIG. 2), the position of the film sheet 8 from the feed-out side to the take-up side, and the position of the sheet stacking tray 36 as shown in FIG. 6, it is possible to correct the curl in the OHP film.

Next, a third embodiment of a sheet original feeding apparatus B according to the present invention will be explained with reference to FIGS. 8 to 10. Incidentally, the same constructional elements as those in the second embodiment are designated by the same reference numerals, and the explanation thereof will be omitted.

In this third embodiment, although the construction of the sheet original feeding apparatus B is substantially the same as that of the second embodiment, drive transmitting portions from the drive means to a feed-out means, take-up means and convey means are simplified. That is to say, the friction mechanisms and the slipping mechanisms comprising the spring clutches regarding the core cylinders 6, 35 and the pair of convey rollers 5 are omitted.

Figure 8:
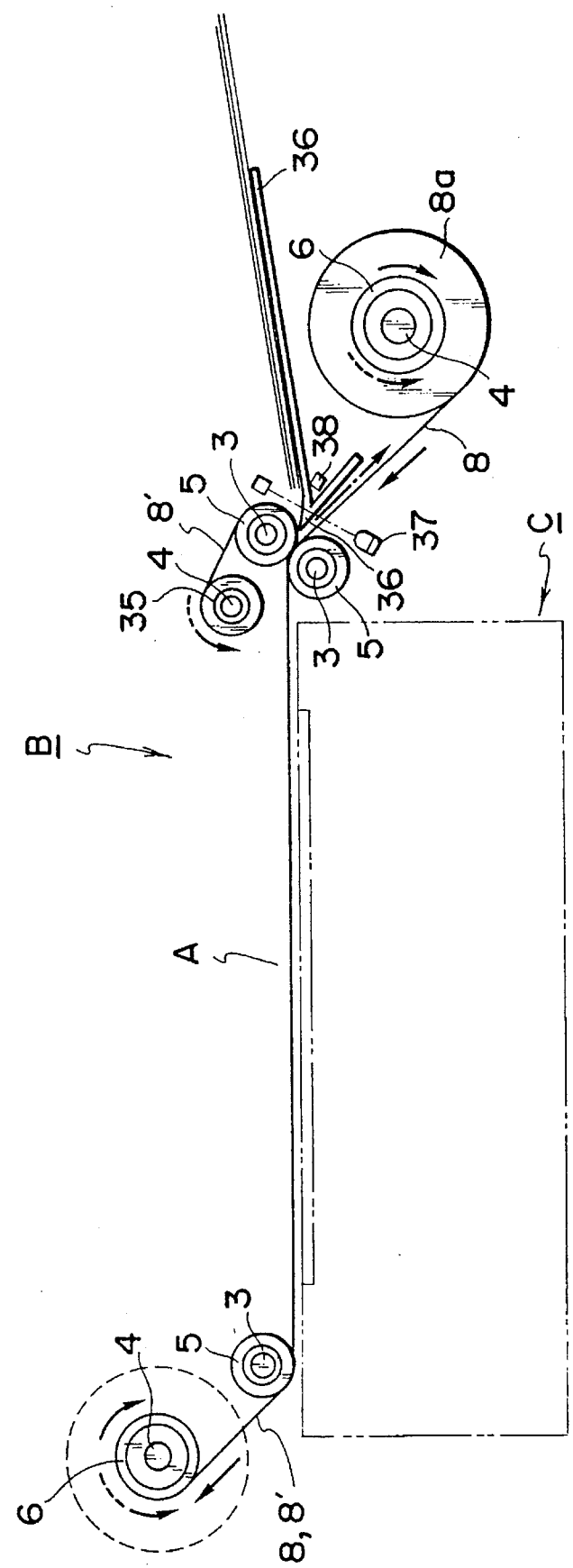
FIG. 8 is a schematic front sectional view of a sheet feeding apparatus according to a still further embodiment of the present invention.

In FIG. 8, the film sheets 8, 8' fed out from the feed-out (right) core cylinders 6, 35, respectively, are directed to bend around the convey rollers 5 respectively and pass through the nip between the convey rollers 5 to be overlapped with each other. Then, the film sheets 8, 8' are wound around a take-up core cylinder 6 while being overlapped, through the take-up (left) convey rollers 5. The film sheets 8, 8' are shifted in such a manner that they are overlapped with each other at least at the projecting station A and are in parallel with the surface of the glass platen of the OHP apparatus C between the left and right pairs of convey rollers 5.

Further, in the vicinity of the nip between the pair of the feed-out convey rollers 5, there is arranged a sheet stacking tray 36 for stacking a plurality of OHP films 28 and for supplying the OHP film to the nip of the convey rollers 5. The sheet stacking tray 36 has a wedge-shaped guide portion 36a disposed near the nip of the convey rollers 5, which guide portion serves to guide the feeding direction of the OHP film 28 and to guide the feeding of the film sheets 8, 8' into the feed-out side. Further, the sheet stacking tray 36 is shiftably supported by a frame (not shown).

Further, in the vicinity of the nip of the convey rollers 5, there is disposed a sheet sensor 37. When the sheet sensor 37 detects a leading end of the OHP film 28 inserted along the sheet stacking tray 36, the drive means (not shown) is driven normally to rotate the take-up core cylinder 6 in a clockwise direction (shown by the solid arrow). In this case, the feed-out core cylinders 6, 35 and the pair of feed-out convey rollers 5 are rotatingly driven by the fed out film sheets 8, 8' so that the film sheets are conveyed to be wound around the take-up core cylinder 6. Meanwhile, the OHP film 28 is pinched between the film sheets 8, 8' and is brought to the projecting station A while being pinched.

The film sheets 8, 8' are shifted at the same feeding speed, and the curl in the OHP film 28 is corrected between the film sheets 8, 8' to maintain the flatness of the OHP film. The OHP film is brought to the projecting station A in this condition, and the image on the OHP film is projected onto the screen. Further, the OHP film 28 pinched between the film sheets 8, 8' is sent to the take-up side by the take-up convey roller 5, and the OHP film is rolled up in the sheet roll on the take-up convey roller 5, and the OHP film is rolled up in the sheet roll on the take-up core cylinder 6 while being pinched between the film sheets 8, 8', and held therein. In this case, the OHP films 28 can be sealingly held without deviation and/or skew-feed and without the direct contact between the imaged surfaces of the films and the outer peripheral surface of the sheet roll. As mentioned above, only by rotatingly driving the take-up core cylinder 6, it is possible to feed the film sheets 8, 8', thereby saving the driving power and simplifying the drive transmitting portion.

Incidentally, as will be described later, a microswitch 38 for switching the drive direction of the drive means to rewind the film sheets 8, 8' onto the feed-out core cylinders is arranged below the sheet stacking tray 36.

Next, the use of the sheet original feeding apparatus B so constructed will be explained.

A plurality of OHP films 28 are previously stacked on the sheet stacking tray 36 in the explanation order. Whenever the OHP films 28 (from the uppermost one on the stack) are successively inserted into the nip between the pair of convey rollers 5, the sheet sensor 37 detects each OHP film 28 to activate the drive means so that each OHP film 28 is conveyed while being pinched between the film sheets 8, 8' and then is rolled up in the sheet roll on the take-up core cylinder 6, via the convey roller 5, while being pinched between the film sheets 8, 8', and is temporarily held therein.

Then, the drive means is driven reversely so that the OHP films 28 are shifted in the order opposite to the explanation order while being pinched between the film sheets 8, 8'. As a result, the OHP films 28 are passed through the nip between the feed-out convey rollers 5 and then are guided by the guide portion 36a and are rolled up in the sheet roll on the feed-out core cylinder 6 while being rested on the film sheet 8 and are held therein.

In this case, the driving force is transmitted to the feed-out core cylinders 6, 35 to rotate them in directions shown by the broken line arrows. However, in this case, it is so selected that the line speed of the film sheet 8' becomes slightly greater than the line speed of the film sheet 8. Further, due to the slipping mechanism which causes the slipping by a tension force considerably smaller than a tension force applied to the film sheet 8, the line speed of the film sheet 8' becomes the same as that of the film sheet 8. Whereby, the slack of the film sheets 8, 8' is prevented during the rewinding operation., thereby maintaining the stability of the OHP films 28 during the feeding thereof. In this way, prior to the presentation in the lecture, the OHP films 28 are stocked and held at the feed-out side in the explanation order, thus completing the preparation.

Figure 9:
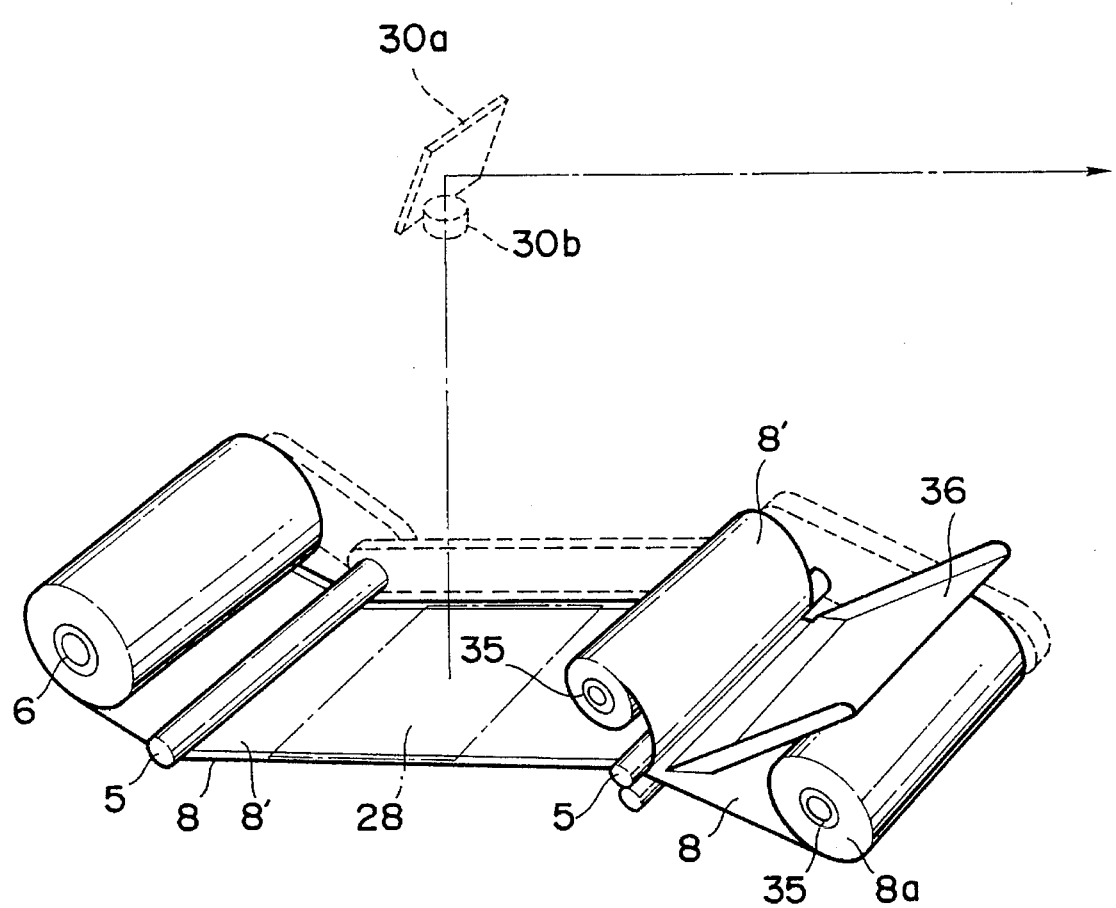
FIG. 9 is a perspective view of a sheet feeding apparatus according to the other embodiment of the present invention.

In performing the presentation in the lecture, as in the first embodiment, by feeding out the film sheet 8 wound around the feed-out core cylinder 6 gradually by the remote control, as shown in FIG. 9, the OHP films 28 rolled up and held in the sheet roll can be brought to the projecting station A successively in the explanation order while being pinched between the film sheets 8, 8' and can be projected onto the screen successively. The projected OHP films can be rolled up around the take-up core cylinder 6 while being pinched between the film sheets 8, 8'. When any OHP film 28 already projected is to be projected again, by driving the drive means reversely again so that the film sheets 8, 8' are fed to be wound around the feed-out core cylinders 6, 35, respectively, the desired OHP film can be brought to the projecting station A again.

Next, the recovering operation for the OHP film 28 rolled up around the take-up core cylinder 6 which is effected after the presentation was finished and all of the OHP films 28 were projected will be explained with reference to FIG. 10.

The user shifts the sheet stacking tray 36 to a position shown by the two-dot chain line in FIG. 10 where the leading end of the guide portion 36a is shifted into a feeding path of the film sheet 8 extending from the nip between the convey rollers 5 to the feed-out core cylinder 6. In this case, the film sheet 8 is displaced as shown by the two-dot chain line by the abutment between the guide portion 36a and the film sheet, thereby slightly rotating the take-up core cylinder 6 in the anti-clockwise direction to feed out the film sheets 8, 8' therefrom. At the same time, the microswitch 38 is depressed by the movement of the sheet stacking tray 36, thereby driving the drive means reversely. As a result, the film sheets 8, 8' start to be wound around the feed-out core cylinders 6, 35.

When each OHP film 28 fed while being pinched between the film sheets 8, 8' passes through the nip of the feed-out convey rollers 5, the film sheet 8' is separated from the OHP film and the latter is further shifted while being rested on the film sheet 8. In this case, however, since the wedge-shaped guide portion 36a is in the feeding path of the film sheet 8, the OHP films 28 are successively picked up by the guide portion 36a and are collected onto the sheet stacking tray 36. When all of the OHP films 28 are collected on the sheet stacking tray 36, the latter is returned to the original position to separate it from the microswitch 38, thereby stopping the drive means to finish the winding operation of the film sheets 8, 8'.

According to the arrangement as mentioned above, since the friction mechanisms and the slipping mechanisms comprising the clutch springs are omitted from the drive transmitting portions regarding the core cylinders 6, 35 and the pair of convey rollers 5, the apparatus can be simplified and be made inexpensive, and the assembling efficiency can be improved. Further, since the OHP films 28 pinched between the film sheets 8, 8' can be automatically recovered or collected, the operability can be further improved.

What is claimed is:

1. A sheet original feeding apparatus comprising:

a pair of spaced core members;

frame means for rotatably holding said core members;

an elongated sheet having each end connected to one of said core members, and wound around one of said core members, and adapted to hold a sheet original therein;

rotary convey means disposed between said core members and a predetermined position and adapted to nip and convey said elongated sheet and the sheet original on said elongated sheet;

drive means for reversibly driving said rotary convey means and said core members; and control means for controlling said drive means to unwind said elongated sheet, thereby stopping the sheet original at a predetermined position.

2. A sheet original feeding apparatus to claim 1, further comprising sheet detection means for detecting leading and trailing ends of the sheet original.

3. A sheet original feeding apparatus according to claim 1, further comprising support shafts interconnecting said frame means and serving as rotary shafts for said core members and said convey means, and wherein said core members and said convey means are rotated around said rotary shafts.

4. A sheet original feeding apparatus according to claim 3, further comprising slipping means provided between said core members and said supporting shaft for allowing an idle rotation of said support shaft when a load larger than a predetermined load is applied to said core members.

5. A sheet original feeding apparatus according to claim 1, further comprising remote operation means for controlling said control means.

6. A sheet original feeding apparatus comprising:

a pair of spaced core members;

frame means for rotatably holding said core members;

an elongated sheet having each end connected to one of said core members, and wound around one of said core members, and adapted to hold a sheet original therein;

drive means for reversibly driving said core members;

control means for controlling said drive means to unwind said elongated sheet, thereby stopping the sheet original at a predetermined position; and a sheet stacking tray for supporting a stack of sheets to be fed to said elongated sheet.

7. A sheet original feeding apparatus according to claim 6, further comprising control means for leading a sheet original fed from said sheet stacking tray to said elongated sheet by said rotary convey means, and then for rewinding said elongated sheet to wind the sheet original, wherein a plurality of sheet originals are wound by repeating the above operation for each sheet original, and then a plurality of sheet originals are unwound one by one to be led to a predetermined position.

8. A sheet original feeding apparatus according to claim 7, wherein said elongated sheet is a transparent film sheet.

9. A sheet original feeding apparatus comprising:

a pair of spaced core members;

frame means for rotatably holding said core members;

an elongated sheet having each end connected to one of said core members, and wound around one of said core members, and adapted to hold a sheet original therein;

drive means for reversibly driving said core members;

control means for controlling said drive means to unwind said elongated sheet, thereby stopping the sheet original at a predetermined position;

an auxiliary elongated sheet for cooperating with said elongated sheet to pinch the sheet original therebetween and adapted to be fed together with said elongated sheet; and means for reciprocating said auxiliary elongated sheet to cooperate with said elongated sheet.

10. A sheet original feeding apparatus according to claim 9, further comprising a pair of core members for winding said auxiliary elongated sheet.

11. A sheet original feeding apparatus according to claim 10, further comprising introduction means for introducing the sheet original between said elongated sheet and said auxiliary elongated sheet.

12. A sheet original feeding apparatus according to claim 10, further comprising guide means, disposed at a joining portion of said elongated sheet and said auxiliary elongated sheet, for switching positions between a first position where the sheet original is directed toward an elongated sheet winding side and a second position where the sheet original is discharged out of the apparatus.

13. A sheet original feeding apparatus according to claim 9, further comprising a core member for winding said auxiliary elongated sheet.

14. A sheet original feeding apparatus according to claim 13, further comprising introduction means for introducing the sheet original between said elongated sheet and said auxiliary elongated sheet.

15. A sheet original feeding apparatus according to claim 13, further comprising guide means, disposed at a joining portion of said elongated sheet and said auxiliary elongated sheet, for switching positions between a first position where the sheet original is directed toward an elongated sheet winding side and a second position where the sheet original is discharged out of the apparatus.

16. A sheet original feeding apparatus according to claim 9, further comprising introduction means for introducing the sheet original between said elongated sheet and said auxiliary elongated sheet.

17. A sheet original feeding apparatus according to claim 9, further comprising guide means, disposed at a joining portion of said elongated sheet and said auxiliary elongated sheet, for switching positions between a first position where the sheet original is directed toward an elongated sheet winding side and a second position where the sheet original is discharged out of the apparatus.

18. An overhead projector comprising:

a pair of spaced core members;

frame means for rotatably holding said core members;

an elongated sheet having each end connected to one of said core members, and wound around one of said core members, and adapted to hold a sheet original therein;

drive means for reversibly driving said core members;

control means for controlling said drive means to unwind said elongated sheet, thereby stopping the sheet original at a reading and projecting station;

a sheet stacking tray for guiding the sheet originals to said elongated sheet; and an optical system, including a light source, for projecting an image of the sheet original.

19. An overhead projector according to claim 18, wherein said core members, said frame means, said elongated sheet, said drive means and said control means are removably mounted on the projector as a sheet original feeding apparatus.

20. An overhead projector according to claim 19, wherein said elongated sheet is a transparent film sheet.

21. An overhead projector according to claim 20, wherein sheet originals are successively rested on said elongated sheet fed out from said core member, and then are shifted by winding said elongated sheet around the other of said core members, thereby rolling up the sheet originals around said other core member together with said elongated sheet and holding them, and a desired sheet original is picked up by unwinding said elongated sheet by a predetermined length.

22. An overhead projector comprising:

a pair of spaced core members;

frame means for rotatably holding said core members;

an elongated sheet having each end connected to one of said core members, and wound around one of said core members, and adapted to hold a sheet original therein;

drive means for reversibly driving said core members;

control means for controlling said drive means to unwind said elongated sheet, thereby stopping the sheet original at a reading and projecting station;

an auxiliary elongated sheet for cooperating with said elongated sheet to pinch the sheet original therebetween and adapted to be fed together with said elongated sheet;

means for reciprocating said auxiliary elongated sheet to cooperate with said elongated sheet; and an optical system, including a light source, for projecting an image of the original sheet.

23. An overhead projector comprising:

a pair of spaced core members;

frame means for rotatably holding said core members;

an elongated sheet having each end connected to one of said core members, and wound around one of said core members, and adapted to hold a sheet original therein;

rotary convey means disposed between said core members and the reading and projecting station and adapted to nip and convey said elongated sheet and the sheet original on said elongated sheet;

drive means for reversibly driving said rotary convey means and said core members;

control means for controlling said drive means to unwind said elongated sheet, sheet original at a reading and projecting station; and an optical system, including a light source, for projecting an image of the original sheet.

* * * * *

UNITED STATES PATENT AND TRADEMARK OFFICE
CERTIFICATE OF CORRECTION

PATENT NO. : 5,622,365
DATED : April 22, 1997
INVENTOR(S) : Ito

It is certified that error appears in the above-indentified patent and that said Letters Patent is hereby corrected as shown below:

COLUMN 1:

Line 5, "1993now" should read --1993, now--.

COLUMN 2:

Line 64, "while" should read --original itself and by shifting the elongated sheet while--.
Line 65, "elongated" should read --the elongated--.
Line 66, "undulation" should read --undulations--.

COLUMN 3:

Line 5, "same" (first occurrence) should be deleted.

COLUMN 7:

Line 48, "some" should read --the same--.

COLUMN 8:

Line 29, "undulation" should read --undulations--.
Line 66, "undulation," should read --undulations,--.

COLUMN 10:

Line 37, "sheet 8, 8'" should read --sheets 8, 8'--.

COLUMN 12:

Line 60, "it is" should read --is it--.

UNITED STATES PATENT AND TRADEMARK OFFICE
CERTIFICATE OF CORRECTION

PATENT NO. : 5,622,365
DATED : April 22, 1997
INVENTOR(S) : Ito

It is certified that error appears in the above-indentified patent and that said Letters Patent is hereby corrected as shown below:

COLUMN 14:

Line 41, "apparatus" should read --apparatus according--.

COLUMN 16:

Line 11, "guiding the" should read --supporting a stack of-- and "to said" should read --to be fed to said--.
Line 62, "sheet, sheet" should read --sheet, thereby stopping the sheet--.

Signed and Sealed this

Ninth Day of June, 1998

Attest:

BRUCE LEHMAN

Attesting Officer

Commissioner of Patents and Trademarks